(12) United States Patent
Munteanu et al.

(10) Patent No.: US 11,696,138 B2
(45) Date of Patent: Jul. 4, 2023

(54) SECURITY APPLIANCE FOR PROTECTING POWER-SAVING WIRELESS DEVICES AGAINST ATTACK

(71) Applicant: Bitdefender IPR Management Ltd., Nicosia (CY)

(72) Inventors: Cristian Munteanu, Iasi (RO); Balint Szente, Tirgu Mures (RO); Gyula Farkas, Nicolesti (RO)

(73) Assignee: Bitdefender IPR Management Ltd., Nicosia (CY)

( * ) Notice: Subject to any disclaimer, the term of this patent is extended or adjusted under 35 U.S.C. 154(b) by 225 days.

(21) Appl. No.: 17/248,909

(22) Filed: Feb. 12, 2021

(65) Prior Publication Data

US 2021/0385658 A1 Dec. 9, 2021

Related U.S. Application Data

(60) Provisional application No. 62/705,044, filed on Jun. 9, 2020.

(51) Int. Cl.
*H04W 12/61* (2021.01)
*H04W 12/71* (2021.01)
(Continued)

(52) U.S. Cl.
CPC ......... *H04W 12/48* (2021.01); *H04L 67/1091* (2013.01); *H04L 67/55* (2022.05);
(Continued)

(58) Field of Classification Search
CPC ..... H04W 12/48; H04W 12/61; H04W 12/71; H04W 12/122; H04W 76/10;
(Continued)

(56) References Cited

U.S. PATENT DOCUMENTS 9,258,713 B2 * 2/2016 Rangarajan ......... H04W 64/003
9,801,062 B2 10/2017 Niewczas et al.
(Continued)

FOREIGN PATENT DOCUMENTS

EP 3148237 A1 * 3/2017

OTHER PUBLICATIONS

Garbelini et al., "SweynTooth: Unleashing Mayhem over Bluetooth Low Energy," https://asset-group.github.io/disclosures/sweyntooth/sweyntooth.pdf, downloaded on Apr. 30, 2020.
(Continued)

*Primary Examiner* — Lizbeth Torres-Diaz
(74) *Attorney, Agent, or Firm* — Law Office of Andrei D Popovici, PC

(57) ABSTRACT

Described systems and methods allow protecting multiple wireless Internet-of-things (IoT) devices against impersonation attacks. In some embodiments, a security appliance detects an availability notification (e.g., a Bluetooth® Low Energy advertisement) emitted as part of a protocol of establishing a wireless connection between two devices. The security appliance may then determine whether the detected notification fits a baseline notification pattern of the apparent sender. When no, the security appliance may attack the sender device by replying to the respective availability notification and initiating a handshake.

23 Claims, 6 Drawing Sheets

(51) Int. Cl.
    *H04W 12/122*     (2021.01)
    *H04L 67/1087*    (2022.01)
    *H04W 12/48*      (2021.01)
    *H04L 67/55*      (2022.01)

(52) U.S. Cl.
    CPC ......... *H04W 12/122* (2021.01); *H04W 12/61* (2021.01); *H04W 12/71* (2021.01)

(58) Field of Classification Search
    CPC ..... H04W 12/50; H04W 24/06; H04W 12/70; H04L 67/1091; H04L 63/1491; H04L 67/55; G06F 21/577
    See application file for complete search history.

(56) References Cited

U.S. PATENT DOCUMENTS

| | | | |
|---|---|---|---|
| 9,923,713 B2 | 3/2018 | Alexandru et al. | |
| 9,942,837 B2 | 4/2018 | Zakaria | |
| 10,230,522 B1* | 3/2019 | Roths | H04L 67/12 |
| 10,616,249 B2 | 4/2020 | C et al. | |
| 2004/0209634 A1* | 10/2004 | Hrastar | H04W 12/088 455/515 |
| 2009/0193119 A1 | 7/2009 | Saxena | |
| 2012/0303808 A1* | 11/2012 | Xie | H04L 63/101 709/225 |
| 2015/0019714 A1 | 1/2015 | Shaashua et al. | |
| 2016/0029221 A1* | 1/2016 | Suarez Garcia | H04W 12/128 455/410 |
| 2018/0124111 A1* | 5/2018 | Gupta | H04W 12/06 |
| 2018/0352434 A1* | 12/2018 | Ohtsu | H04L 63/0435 |
| 2019/0166502 A1 | 5/2019 | Chaskar | |
| 2019/0238570 A1* | 8/2019 | Mehner | G06F 21/55 |
| 2020/0145456 A1* | 5/2020 | Fugate | H04L 63/0464 |
| 2020/0162924 A1* | 5/2020 | Desai | H04W 12/108 |
| 2021/0112093 A1* | 4/2021 | Dusíková | H04L 63/1466 |
| 2021/0126939 A1* | 4/2021 | Sullivan | H04L 63/1441 |

OTHER PUBLICATIONS

Gullberg, "Denial of Service Attack on Bluetooth Low Energy," https://www.researchgate.net/publication/317063884_Denial_of_Service_Attack_on_Bluetooth_Low_Energy, May 23, 2017.

Symon, "Detecting Relay Attacks against Bluetooth Communications on Android," https://researchcommons.waikato.ac.nz/handle/10289/12077, Master's Degree Thesis, Univ. of Waikato, New Zealand, 2018; the year of publication is sufficiently earlier than the effective U.S. filing date and any foreign priority date so that the particular month of the publication is not in issue.

Teschler, "Breaking BLE—Vulnerabilities in Pairing Protocols Leave Bluetooth Devices Open for Attack," https://www.microcontrollertips.com/breaking-ble-vulnerabilities-in-bluetooth-pairing-provide-openings-for-attack-faq/, downloaded on Apr. 30, 2020.

European Patent Office (EPO), Extended Search Report dated Feb. 24, 2022 for European Patent Application No. 21197118.9-1213.

Wu et al., "BlueShield: Detecting Spoofing Attacks in Bluetooth Low Energy Networks," USENIX, the Advanced Computing Systems Association, pp. 1-16, http://www.usenix.org/system/files/raid20-wu.pdf, Oct. 8, 2020.

Zolfaghar et al., "Securing Bluetooth-Based Payment System Using Honeypot," Innovations in Information Technology, International Conference on, 2009, IIT '09, pp. 21-25, Dec. 15, 2009.

* cited by examiner

SECURITY APPLIANCE FOR PROTECTING POWER-SAVING WIRELESS DEVICES AGAINST ATTACK

RELATED APPLICATIONS

This application claims the benefit of the filing date of U.S. provisional patent application No. 62/705,044, filed on Jun. 9, 2020, entitled "Security Appliance for Protecting Power-Saving Wireless Devices Against Attack," the entire contents of which are incorporated by reference herein.

BACKGROUND

The invention relates to computer security systems and methods, and in particular, to protecting electronic appliances against attack by a malicious device.

A great variety of devices, informally referred to as the Internet of Things (IoT), are currently being connected to communication networks and the Internet. Such devices include, among others, smartphones, smartwatches, TVs and other multimedia devices, game consoles, and home appliances such as door locks, household robots, refrigerators, surveillance cameras, various sensors, thermostats, sprinklers, etc. As more such devices go online, they become targets for security threats such as malicious software and hacking.

Another recent consumer trend comprises using a variety of small and portable electronic devices to facilitate routine tasks such as scanning barcodes, paying for groceries, unlocking house and car doors, and starting cars, among others. In a typical example, a point-of-sale device at a supermarket may establish a temporary wireless connection with a customer's mobile telephone or electronic wallet device to automatically execute a payment transaction. In another example, a car's computer may establish a temporary wireless connection with the car owner's key and automatically open the car's door or start the engine. In yet another example, a smart door lock may automatically unlock a house bolt in response to sensing the proximity of a target device such as a mobile phone or keyring token.

Yet another trend comprises using a variety of electronic devices for marketing and/or influencing consumer behavior. Examples include marketing beacons which may establish a temporary wireless connection with a customer's mobile telephone, causing the latter to display an availability notification. Some such devices may inconspicuously collect data about the respective customer and/or the respective mobile telephone, for instance register the respective person's location, schedule, buying habits, contacts, etc. Left unprotected, such devices may thus expose the public to a substantial privacy risk.

In view of the above, there is an increasing need of securing wireless electronic devices against malware and malicious manipulation, as well as of protecting communications to and from such devices.

SUMMARY

According to one aspect, a security appliance is configured to protect a client device against computer security threats. The security appliance comprising at least one hardware processor configured, in response to detecting a first wireless communication comprising an availability notification emitted in preparation for establishing a peer-to-peer connection with an administration device, to determine whether the first wireless communication fits a notification pattern specific to the client device. The at least one hardware processor is further configured, when the first wireless communication does not fit the notification pattern, to transmit a second wireless communication configured to mimic a response by the administration device to the first wireless communication. The at least one hardware processor is further configured, in response to transmitting the second wireless communication, to perform a security action to protect the client device or the administration device.

According to another aspect, a method of protecting a client device against computer security threats comprises employing at least one hardware processor of a security appliance, in response to detecting a first wireless communication comprising an availability notification emitted in preparation for establishing a peer-to-peer connection with an administration device, to determine whether the first wireless communication fits a notification pattern specific to the client device. The method further comprises, when the first wireless communication does not fit the notification pattern, employing the at least one hardware processor to transmit a second wireless communication configured to mimic a response by the administration device to the first wireless communication. The method further comprises, in response to transmitting the second wireless communication, employing the at least one hardware processor to perform a security action to protect the client device or the administration device.

According to another aspect, a non-transitory computer-readable medium stores instructions which, when executed by at least one hardware processor of a security appliance, cause the security appliance, in response to detecting a first wireless communication comprising an availability notification emitted in preparation for establishing a peer-to-peer connection with an administration device, to determine whether the first wireless communication fits a notification pattern specific to the client device. The instructions further cause the security appliance, when the first wireless communication does not fit the notification pattern, to transmit a second wireless communication configured to mimic a response by the administration device to the first wireless communication. The instruction further cause the security appliance, in response to transmitting the second wireless communication, to perform a security action to protect the client device or the administration device.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized collection of data. An availability notification is a communication emitted by a device as part of a protocol for connecting with other devices, the availability notification emitted in preparation for initiating a connection. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
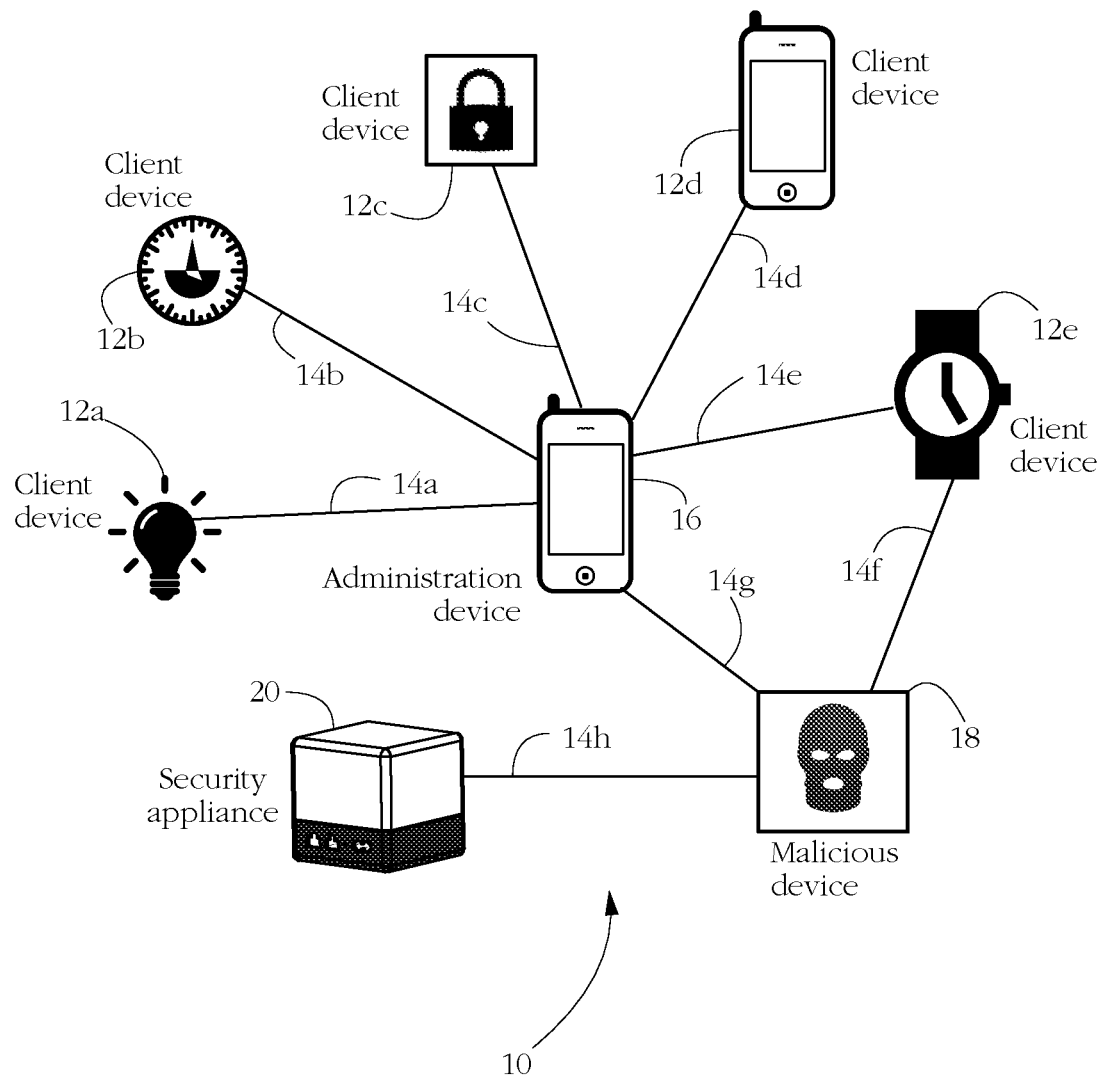
FIG. 1 shows a security appliance for protecting a plurality of client wireless devices against attacks according to some embodiments of the present invention.

FIG. 1 shows a set of exemplary power-saving client devices 12*a-e* protected against attacks by a security appliance 20 according to some embodiments of the present invention. Each client device 12*a-e* may comprise an electronic device having a processor and a memory and capable of exchanging electronic messages with other client devices and/or with an administration device 16. Exemplary client devices 12*a-e* include personal computers, tablet computers, smartphones, gaming consoles, household appliances (e.g., smart TVs, media players, household robots, thermostats, lighting appliances, door locks), as well as wearable computer devices (e.g., smartwatches, virtual reality headsets, health and/or fitness devices, etc.). Another category of exemplary client devices 12*a-e* includes payment terminals (e.g. point of sale devices) and commercial proximity advertising devices, among others.

The term 'power-saving' is used herein to indicate a device and/or a communication strategy/protocol specifically directed at lowering the energy cost of communications. Some power-saving devices are relatively small and battery-operated; their hardware specifications and communication protocols are deliberately chosen to extend the battery life and thus increase the autonomy of the respective device. One exemplary power-saving strategy comprises limiting the emission power and therefore the range of communication (e.g., up to 100 meters for Bluetooth® Low Energy devices, 10-20 meters for Zigbee® devices, etc.). Another power-saving strategy limits the communication data rate (e.g, up to 250 kbit/s for Zigbee® devices). Some power-saving devices deliberately use a power-saving communication protocol wherein communications occurs in concentrated, intermittent bursts. The respective power-saving device may be in a low-powered/sleep mode most of the time, and may wake up occasionally to advertise its presence, location, and/or services. Other devices such as an administration device 16 (FIG. 1) may respond to the respective availability notification and engage the respective power-saving device to negotiate a connection. The communicating parties may then exchange data over the established connection, and after the exchange is over, the power-saving device may return to a low-powered state. Exemplary power-saving protocols include the Bluetooth® Low Energy (BLE) family of protocols. For simplicity and clarity, the following description will assume that communications are carried out according to the BLE protocol. However, BLE is used only as an example and is not meant to limit the scope of the present invention. A skilled artisan will understand that the present teachings may be adapted to any communication protocol wherein the protected device announces its presence/availability by broadcasting an availability notification, and wherein a connection is initiated by a partner device responding to the respective availability notification.

Each client device 12*a-e* may communicate with a partner device (e.g., administration device 16) over a wireless connection, illustrated as items 14*a-e* in FIG. 1. Connections 14*a-e* represent peer-to-peer links/communication channels characterized by a set of mutually agreed parameters, such as a carrier frequency band and a pair of physical addresses (e.g., media access control—MAC addresses) of the respective communication partners. The term 'peer-to-peer' is herein used to denote a manner of communicating wherein data is exchanged directly between the connection endpoints, i.e., without being routed via a third party such as a network controller. In an open systems interconnection (OSI) model of computer networking, connections 14*a-e* may represent a data link layer, i.e., functional and procedural means of transferring data between the endpoints of the respective connection. Individual wireless connections 14*a-e* may be set up and operated according to a power-saving communication protocol such as BLE.

In some embodiments, administration device 16 comprises a computing appliance (e.g., smartphone, personal computer) which manages a connection and/or a service offered by a selected client device 12*a-e*. Managing a connection (e.g., connections 14*a-e* in FIG. 1) may include setting/negotiating connection parameters such as a network address, frequency band, and cryptographic parameters, among others. Managing a service may include, for instance, configuring parameters of the respective service and/or client device and transmitting a command to the respective client device, the command causing the respective device to perform a specific task (e.g., set a desired temperature on a thermostat, open a door lock, register a payment, etc.). In some embodiments implementing the BLE protocol(s), administration device 16 may represent a master/central device, while a client device may represent a slave/peripheral device. Although FIG. 1 shows a single administration device 16, an artisan will understand that not all client devices 12a-e may connect to the same administration device; in embodiments, distinct client devices may connect to distinct administration devices. However, in exemplary embodiments, a single administration device 16 (e.g., a smartphone) may indeed connect with and manage multiple client devices 12a-e, such as a thermostat, a door lock, and a fitness band.

A malicious device 18 may attempt to attack a selected client device and/or administration device 16. An attack denotes an attempt to connect to a target device with an illegitimate/malicious goal such as interfering with the normal operation of the target device and/or sniffing data received or emitted by the target device. Attacking a target device may further comprise impersonating a legitimate partner of the target device, in order to trick the target device into accepting a connection from, or initiating a connection with, malicious device 18. Attack examples are further detailed below.

In some embodiments, a security appliance 20 comprises an electronic device configured to detect electronic communications from and/or engage in electronic communication with client devices 12a-e, administration device 16, and/or malicious devices 18, with the aim of protecting client devices 12a-e against attack, as described below. Appliance 20 may comprise any electronic device having a processor and wireless communication hardware (e.g., antenna and associated interfaces, etc.). An exemplary security appliance 20 comprises a separate, dedicated appliance comprising electronic circuitry enclosed in a container sized and configured to be placed on a bookshelf, affixed to a wall, etc. In other embodiments, security appliance 20 may comprise a portable, battery-powered device integrated into an accessory such as a keychain, watch, wallet, or other wearable object.

In an alternative embodiment, security appliance 20 shares hardware with a host device, such as a general-purpose computer or a mobile telecommunication device (e.g., smartphone). Security appliance 20 may thus be incorporated into a protected client device 12a-e, administration device 16, and/or a third party device. One such exemplary security appliance comprises a set of software modules executing on a hardware processor of a smartphone, and using communication hardware of the respective smartphone for connecting with protected client devices 12a-e and potentially malicious devices. Another exemplary appliance 20 may be embodied as a separate set of electronic components (e.g., integrated circuits) soldered to or otherwise connected to a motherboard of the host device. For instance, security appliance 20 may be embodied as a peripheral component interconnect (PCI) Express card having any of the form factors known in the art. Another exemplary embodiment comprises a dongle connected to a client device via a universal serial bus (USB) interface. One such exemplary card/dongle may comprise communication hardware such as a radio antenna and associated interfaces, and may or may not have a dedicated hardware processor distinct from the main processor of the respective host device.

Figure 2:
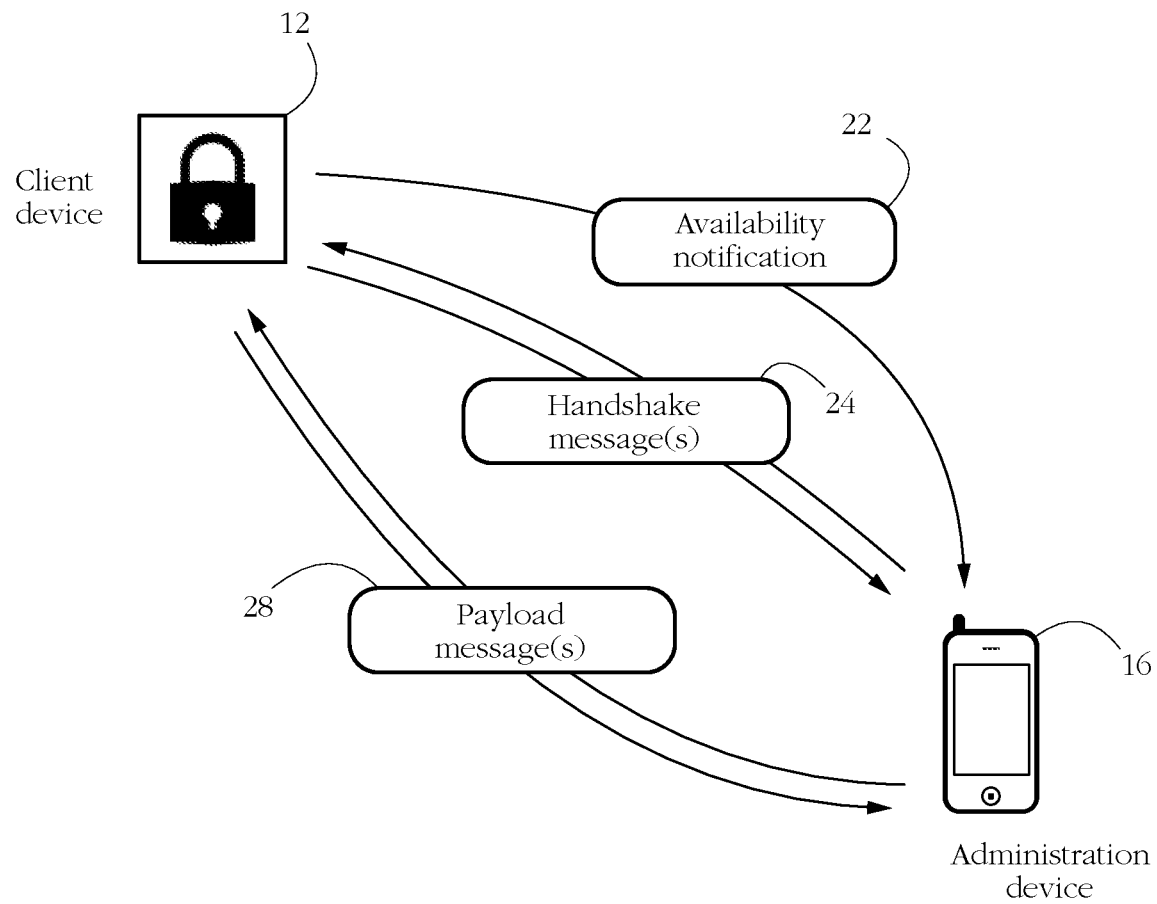
FIG. 2 shows a typical message exchange between two electronic devices according to a power-saving communication protocol.

FIG. 2 shows an exemplary data exchange between a selected client device 12 and administration device 16 according to a power-saving protocol such as Bluetooth® Low Energy (BLE). The illustrated client device 12 generically represents any of client devices 12a-e in FIG. 1. To advertise its presence/availability, client device 12 may wirelessly broadcast an availability notification 22. In a BLE embodiment, availability notification 22 may comprise a BLE advertisement.

Availability notification 22 comprises a communication emitted by the respective device in preparation for establishing a connection. Notifications 22 may be distinguished from other kinds of communications by way of a dedicated data field/flag. In an exemplary BLE embodiment, a specific segment of each data packet (known as a protocol data unit—PDU) indicates whether the respective data packet/communication is an availability notification (known as an advertisement in BLE parlance) or not. The PDU may further specify a notification type of the respective availability notification. Exemplary BLE notification types include nonspecific (the device may connect with any available partner), directed (the device may connect with a specific central/administration device), and nonconnectable (device is not available for connections), among others. Availability notifications 22 may further comprise a device identifier such as a universally unique identifier (UUID), a MAC address, a manufacturer ID, and/or a device name, among others. Some availability notifications 22 may comprise a set of indicators/flags indicating various aspects of a functionality of client device 12, for instance an indicator of a device type, an indicator of a type of service offered by the respective client device (e.g., thermostat, point-of-sale device, etc.), a set of frequencies/channels available for communication, etc.

Meanwhile, administration device 16 may scan for availability notifications. In response to detecting availability notification 22, administration device 16 may initiate a connection with client device 12 via a handshake exchange 24 during which devices 12 and 16 may negotiate a set of communication parameter values (e.g., encryption keys, frequency band, etc.). In response, devices 12-16 may exchange a set of payload messages 28 formatted according to negotiated parameter values, payload messages 28 comprising, for instance, indicators of a current state of client device 12 (e.g., a current temperature, in the case of a thermostat), an encoding of a command transmitted from administration device 16 to client device 12, etc.

Figure 3:
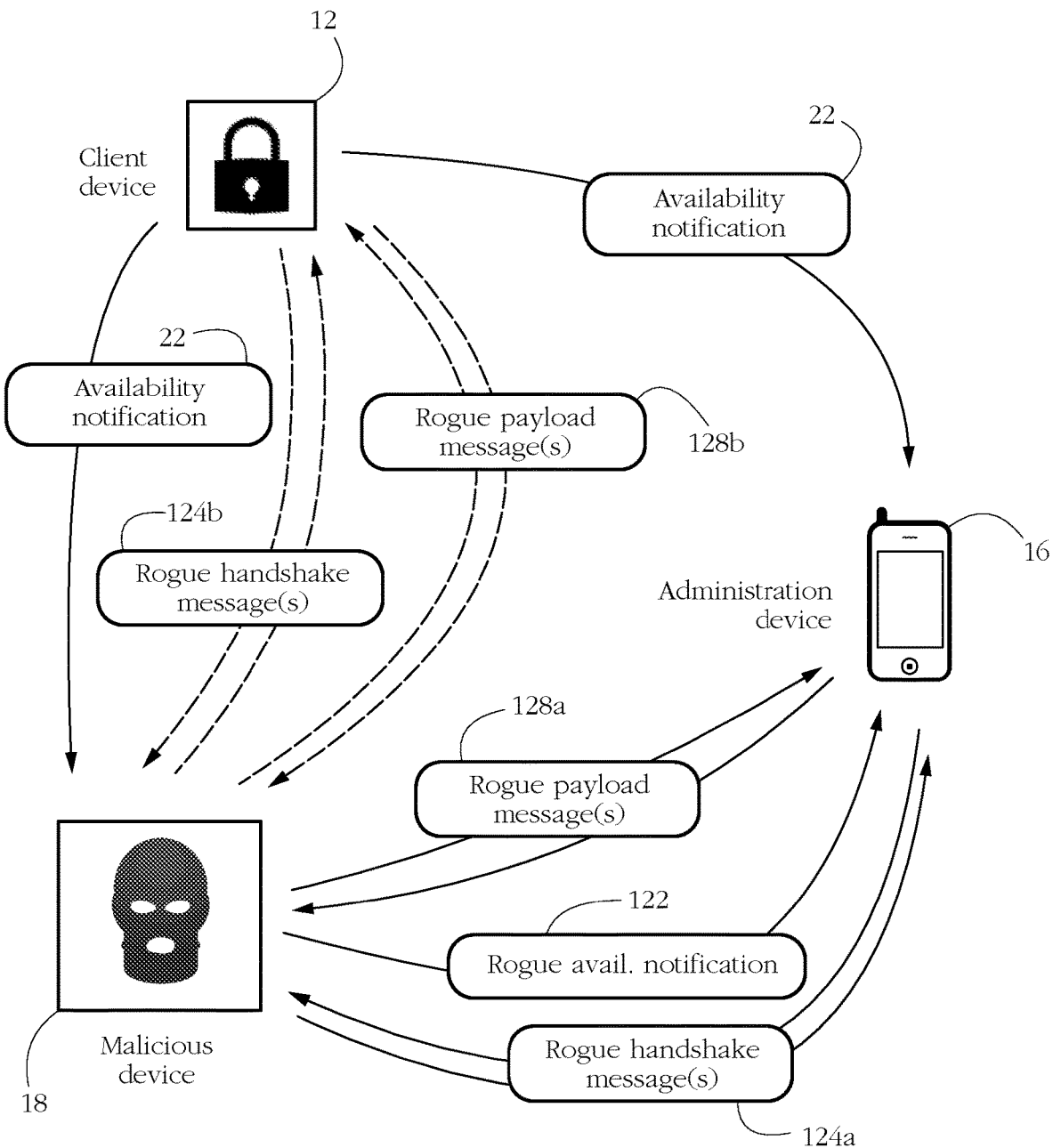
FIG. 3 illustrates an exemplary message exchange occurring during an attack wherein a malicious device impersonates a legitimate device.

A malicious attacker may intrude into such communications between a client device and administration device 16, to passively eavesdrop and/or actively participate in an attack. In one example of an attack illustrated in FIG. 3, malicious device 18 may be used to initiate a connection to client device 12 and/or administration device 16 (see e.g., connections 14f-g in FIG. 1). Malicious device 18 may impersonate client device 12 by broadcasting a rogue availability notification 122 and thus tricking administration device 16 into establishing a connection with malicious device 18 by engaging in a rogue handshake exchange 124a. Following a successful handshake, malicious device 18 may read communications destined for client device 12. In another example, malicious device 18 may impersonate administration device 16 and respond to an availability notification broadcast by client device 12, thereby engaging in a rogue handshake exchange 124b with client device 12. Malicious device 18 may thus trick the respective client device into connecting to malicious device 18 instead of administration device 16. If successful, such attack strategies may place malicious device 18 in a man-in-the-middle position wherein it can snoop on, suppress, and/or alter legitimate data exchanges between client device 12 and administration device 16.

Figure 4:
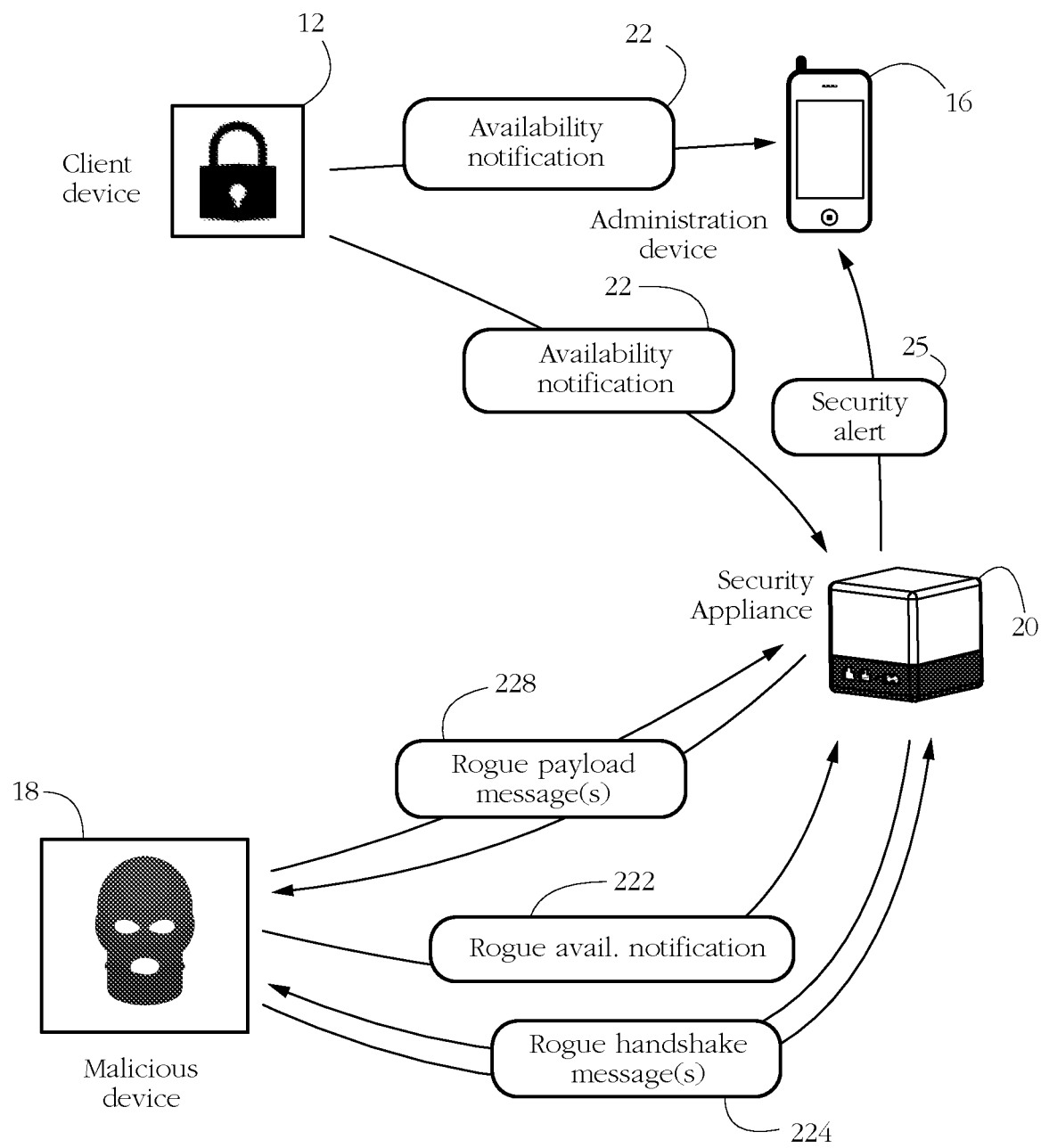
FIG. 4 shows an exemplary message exchange in an embodiment configured to protect against attacks according to some embodiments of the present invention.

FIG. 4 shows an exemplary communication exchange between malicious device 18 and security appliance 20 according to some embodiments of the present invention, the illustrated exchange carried out to protect client device 12 and/or administration device 16 against attack by malicious device 18. In some embodiments, security appliance 20 may listen for and reply to rogue availability notifications 222 emitted by malicious device 18, thus initiating a connection with malicious device 18. To initiate the connection, some embodiments of security appliance 20 engage in a rogue handshake exchange 224 with malicious device 18 while impersonating administration device 16. Stated otherwise, some embodiments trick malicious device 18 into believing that it is communicating with administration device 16 (e.g., connection 14g in FIG. 1), while in fact the respective connection is established with security appliance 20 (e.g., connection 14h in FIG. 1). In some embodiments, security appliance 20 impersonates administration device 16 by using device identification data and/or other features of device 16 (e.g., the same frequency band, same frequency hopping pattern, same network address, etc.) to carry out rogue handshake 224. In response to establishing the connection, security appliance 20 may engage in a rogue payload exchange 228 with malicious device 18, for instance by sending surrogate data to device 18, as shown in more detail below. Alternative embodiments may simply keep the respective connection alive indefinitely or for a pre-determined amount of time, thus preventing malicious device 18 from attempting other connections.

Figure 5:
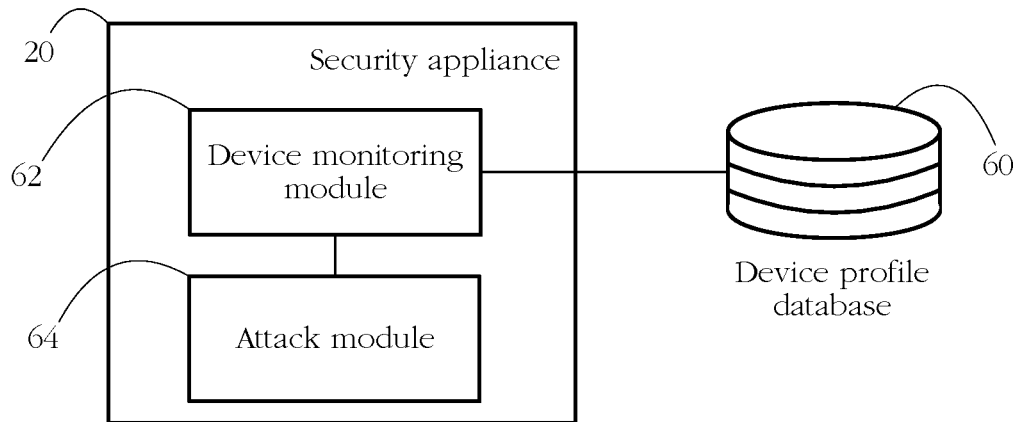
FIG. 5 illustrates exemplary components of a security appliance according to some embodiments of the present invention.

FIG. 5 shows exemplary components of security appliance 20 according to some embodiments of the present invention, said components including a device monitoring module 62 communicatively coupled to an attack module 64. Modules 62 and/or 64 may be embodied as software (computer programs) stored in a memory of appliance 20 and executing on at least one hardware processor of appliance 20. However, a software embodiment is herein given only as an example and is not meant to limit the scope of the present invention. A skilled artisan will understand that the functionality of modules 62 and/or 64 may be implemented in firmware or even dedicated hardware modules, for instance a set of application-specific integrated circuits (ASIC) or field-programmable gate arrays (FPGA) configured to perform the described methods.

In some embodiments, monitoring module 62 is configured to monitor wireless communications occurring in a vicinity of security appliance 20. Monitoring may comprise detecting communications and analyzing the respective communications to extract a set of characteristic features. Monitoring may further comprise determining whether a selected communication fits a baseline communication pattern of an apparent sender of the respective communication. Some embodiments are further configured to determine such a baseline pattern of communications specific to each client device 12a-e and/or administration device 16.

A baseline communication pattern of a device herein comprises a set of data collectively characterizing electronic communications transmitted by the respective device, wherein said characteristic data is not extracted or determined according to a content/payload of a message contained by the respective communications. Instead, characteristic data may be extracted and/or determined from communication metadata and/or other features such as a count and/or frequency of occurrence of communications from the respective device, a calendar, schedule, or other measure of a time distribution of such communications, a time delay between consecutive communications originating from the respective device, an indicator of an intensity/power/amplitude of a signal carrying the respective communications (e.g., a received signal strength indicator—RSSI), said intensity/power/amplitude measured at a reference location such as security appliance 20 or some external sensor, a signal-to-noise ratio of a signal carrying the respective communications, a wave frequency of a signal carrying the respective communications, an originating network address (e.g., BLE address), and an identifier of the sender device identifier (e.g., device name, MAC address), among others. Some embodiments may extract and/or determine such characteristic features according to a content of a header and/or according to metadata contained in each intercepted communication.

A preferred embodiment of monitoring module 62 is configured to determine whether a detected availability notification fits a baseline notification pattern of its apparent sender device, as described in detail below. A baseline notification pattern of a device herein comprises a baseline communication pattern characterizing availability notifications broadcast by the respective device (see e.g., item 22 in FIG. 2). Notification pattern data is extracted from and/or determined according to communication features other than a content/payload of individual notifications. An exemplary notification pattern of a device may include, among others, a characteristic length of a time interval between consecutive availability notifications, a characteristic notification frequency (i.e., count of availability notifications per unit of time), a characteristic RSSI of a carrier signal received from the respective client and measured at security appliance 20 or at another reference location, a characteristic wave frequency of signals carrying availability notifications emitted by the respective client, and a characteristic signal-to-noise ratio calculated for availability notifications received from the respective client. In one example, each characterizing feature of a baseline notification pattern may be expressed as an average (e.g., mean, median, etc.) of a collection of measurements or determinations carried out for individual availability notifications received from the respective device. For instance, one client device may be characterized by an average advertising frequency of 2 Hz (i.e., on average 2 availability notifications per second, or 0.5 seconds between consecutive availability notifications). The typical advertising frequency may be further characterized by a measure of variability, such as a standard deviation. Some characterizing features may be expressed as numerical ranges (e.g., a typical range of network addresses). Other characteristic features may be Boolean; others may be non-numeric (e.g., a device name).

In an alternative embodiment, a baseline notification pattern determined for a selected client device 12 may comprise a collection of records, each record corresponding to a distinct availability notification 22 received from the respective client device 12, each record comprising a set of data characterizing the respective availability notification. An exemplary characteristic data set for an availability notification may include, for instance, a timestamp, a frequency band, a signal intensity, and an originating network address of the respective availability notification, and may further comprise a device identifier of the originating device.

In some embodiments, notification patterns characterizing a set of protected client devices may be collected and/or determined by security appliance 20 itself. In one such example, for each client device within its range, appliance 20 may spend a training period listening for availability notifications and gradually build/determine a baseline notification pattern characterizing the respective device. In an alternative embodiment, a baseline notification pattern may be determined by a service provider and later provisioned to security appliance 20. In one such example, the service provider may determine a catalog of baseline notification patterns characterizing IoT devices of various makes and models. Security appliance 20 may transmit an identifier (e.g., MAC address, make and model) of a selected client device to the service provider and in response, receive an encoding of a baseline notification pattern for the respective client device. The respective pattern may be kept up to date via a software update mechanism.

Baseline notification pattern data may be stored in a device profile database 60, for instance on a non-volatile computer-readable storage medium being part of (or communicatively coupled with) security appliance 20. Such data may be encoded in any computer-readable format known in the art, for instance as an array of numbers, in a version of an extensible markup language (XML), or in JavaScript object notation (JSON).

In some embodiments, attack module 64 is configured to initiate a connection with malicious device 18 (see e.g., connection 14h in FIG. 1). Initiating the connection may comprise engaging in a handshake exchange with device 18 to negotiate a set of connection parameters. During the handshake, some embodiments may impersonate administration device 16 or a protected client device, to trick malicious device 18 into believing it is currently connecting to device 16 or the respective client. Attack module 64 may be further configured to carry out a denial-of-service attack on device 18, for instance by keeping an established connection alive indefinitely by bombarding malicious device 18 with data packets (e.g., pings), thereby preventing it from carrying out its malicious activities.

Figure 6:
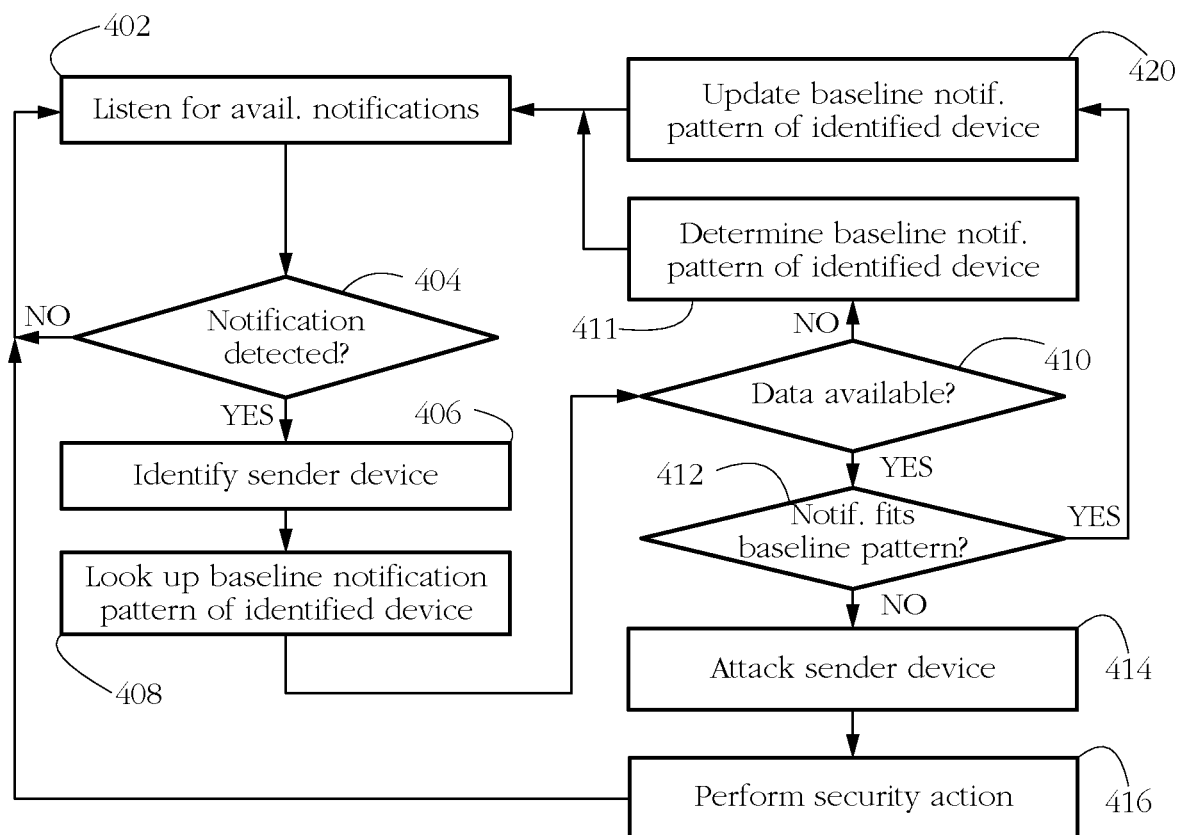
FIG. 6 shows an exemplary sequence of steps performed by the security appliance according to some embodiments of the present invention.

FIG. 6 shows an exemplary sequence of steps performed by security appliance 20 to protect a set of client devices against attack according to some embodiments of the present invention. Some embodiments rely on the observation that in order to trick administration device 16 into connecting with malicious device 18 instead of a client device 12, device 18 may need to send rogue availability notifications 222 (FIG. 4) at other times and/or in substantially greater number than the respective client device. For instance, malicious device 18 may send out availability notifications at smaller time intervals than the targeted client device, in the hope that administration device 16 may pick up and respond to at least one of these messages instead of a legitimate availability notification from the targeted device. Stated otherwise, malicious device 18 may need to advertise in a manner that departs from the baseline notification pattern of the protected client devices. Some embodiments therefore determine a baseline notification pattern for each protected client device 12, and subsequently check whether a current availability notification seemingly originating at a client device fits within the baseline pattern for the respective client device. A departure from the baseline pattern may indicate that a malicious device is currently impersonating the respective client device, so in response to identifying such a suspect availability notification, some embodiments may automatically attack the source of the respective suspect availability notification.

In a sequence of steps 402-404, appliance 20 may listen for availability notifications. When an availability notification is detected, a step 406 may identify the sender of the respective message, for instance according to a network address and/or according to a device identifier (e.g., MAC address, device name, device manufacturer, etc.). Some embodiments may use other identifying features, such as an amplitude, intensity, or signal-to-noise ratio of a carrier signal of the respective availability notification. A sequence of steps 408-410 may determine whether baseline pattern data is available for the identified sender device. When no, a step 411 may create a new baseline notification pattern and associate the new pattern with the respective client device.

Step 411 may comprise extracting a set of features from the intercepted availability notification and computing a set of baseline pattern data characterizing the respective client according to the extracted features. Exemplary baseline notification pattern data may include an average time interval separating consecutive availability notifications emitted by the respective client, an average intensity of a carrier signal for the respective client, a frequency band in which the respective client emits availability notifications, etc. Step 411 may further comprise creating a new database entry/record associated with the current availability notification, populating the record with data extracted from the respective availability notification, and storing the respective record in profile database 60, together with an association indicator connecting the respective record with the client device identified in step 406. In an alternative embodiment, step 411 may comprise fetching baseline notification pattern data from a third party (e.g., a service providing server).

When notification pattern data is available for the identified device, in a step 412 security appliance 20 may determine whether the current availability notification fits the baseline notification pattern of the respective device. Such determinations may comprise comparing selected features extracted from the current availability notification with characteristic features of availability notifications previously received from the respective client. In some embodiments, step 412 comprises calculating a similarity measure (e.g., numerical score) quantifying a degree of similarity between the current availability notification and previous availability notifications received from the same client device, or from devices identical to the respective client device (e.g., same make and model).

In one exemplary embodiment, step 412 may comprise determining a length of the time interval elapsed since the latest availability notification received from the same client device and comparing it with a typical (e.g., average, median) time delay between consecutive availability notifications broadcast by the respective device. When the difference between the current time delay and the recorded characteristic time delay is smaller than a pre-determined threshold, some embodiments may determine that the current availability notification fits the baseline notification pattern of the respective client device, and otherwise not. When step 412 returns a yes, some embodiments may proceed further to a step 420, wherein the existing baseline notification pattern for the respective client device is updated to include data extracted and/or calculated according to the current availability notification.

Alternative embodiments may determine whether the current availability notification fits the baseline pattern of the respective device according to other criteria. For instance, some embodiments may detect a change in the RSSI of the wireless signal carrying the current availability notification, with respect to a baseline RSSI of other communications received from the respective client device. Some embodiments may detect differences in the transmission noise or in a signal-to-noise ratio between a current availability notification and a baseline determined for the respective client device. Relatively large departures from the baseline may indicate that the sender of the current availability notification is another device masquerading as protected client device 12. Other exemplary criteria include the frequency band used to transmit the current availability notification. For instance, some embodiments may determine a baseline pattern of hopping between frequency bands characteristic for a protected client device, and determine whether the current availability notification fits within the baseline pattern according to a frequency band of the current availability notification and further according to a frequency band of a set of previous availability notifications received from the respective client device.

In some embodiments, a similarity measure/score may combine multiple characteristic features of availability notifications received from the respective device (e.g., average time interval between availability notifications and average signal strength). In one such example, an individual similarity score may be computed according to each of a set of characteristic features. An aggregate similarity score may then be determined according to the individual scores, for instance as a weighted average:

$$S_A = \Sigma_i w_i \sigma_i, \quad [1]$$

wherein $\sigma_i$ denote individual similarity scores (e.g., a score determined according to a time interval between successive availability notifications, a score derived according to RSSI, etc.) and $w_i$ denote individual weights, for instance normalized so that the aggregate similarity score $S_A$ falls between pre-determined bounds (e.g., between 0 and 1). Weights $w_i$ may be independently adjusted to reflect a relevance of each individual feature to the aggregated score $S_A$. Some embodiments may then determine whether the current availability notification fits the baseline notification pattern of the respective client device according to a result of comparing $S_A$ with a pre-determined threshold.

Some embodiments may apply more sophisticated methods to determine whether the current availability notification fits the baseline notification pattern of the respective client device. In one such example, security appliance 20 may comprise a set of neural networks trained on a corpus of legitimate availability notifications using various machine learning procedures. Following training, such neural networks may be used to determine whether a currently detected availability notification fits the learned legitimate pattern or not. In such embodiments, a baseline pattern may be encoded in a set of parameters (e.g., synapse weights) of the trained neural network. Another exemplary embodiment may train a support vector machine (SVM) to learn the baseline notification pattern of each protected client device 12a-e and then apply the respective SVM to determine whether a current availability notification fits the baseline pattern(s) or not. Yet another exemplary embodiment may represent each availability notification as a vector in an abstract space of message features. A baseline pattern of a client device may then be represented as a cluster of vectors in the respective abstract space. Some embodiments may then determine whether a current availability notification fits the baseline pattern according to a distance between a vector representing the current message and a center/centroid of the cluster representing the respective client device.

When the current availability notification does not fit the baseline pattern for the respective device, appliance 20 may employ attack module 64 to attack the sender of the respective notification (presumably malicious device 18, see FIG. 4). Step 414 may comprise mimicking a response by administration device 16 to the current notification, e.g., initiating a handshake with the sender device to establish a peer-to-peer connection. Mimicking herein encompasses reproducing the actions that device 16 would take in the respective circumstances, and performing another set of actions that produce the same effect. Mimicking may further comprise impersonating administration device 16 by using credentials (e.g., network address, device identifier, etc.) and/or communication characteristics (e.g., frequency band/channel, signal intensity) of administration device 16.

Once successfully completing a handshake exchange and establishing a connection with the sender of the current availability notification, in a step 416 some embodiments may perform a security action to protect administration device 16 and/or client devices 12a-e against attack by malicious device 18. One exemplary security action comprises keeping the connection established in step 414 alive for a pre-determined time period or indefinitely, by bombarding malicious device 18 with data (e.g., pings). Another exemplary security action comprises engaging in rogue payload exchanges with the sender device over the established connection, for instance transmitting surrogate data to the respective device to mimic a legitimate command or other legitimate communication. The term 'surrogate data' herein denotes replacement data having the same data type, format, and/or range as legitimate data that administration device 16 may transmit in the given circumstances. Surrogate data may be generated ad hoc (e.g., randomly) or pre-defined.

Yet another example, step 416 may comprise sending out a security alert 25 (FIG. 4) to notify a user/administrator about the occurrence of a suspect event. The alert may include an identifier of the respective protected client device 12 (i.e., apparent sender of the suspect availability notification) and/or a description of the incident. Alert 25 may be transmitted directly to administration device 16 using a local wireless connection, or over an extended network such as the Internet to a remote server computer for further transmission to administration device 16 or to another device configured to process and/or display alert 25.

Figure 7:
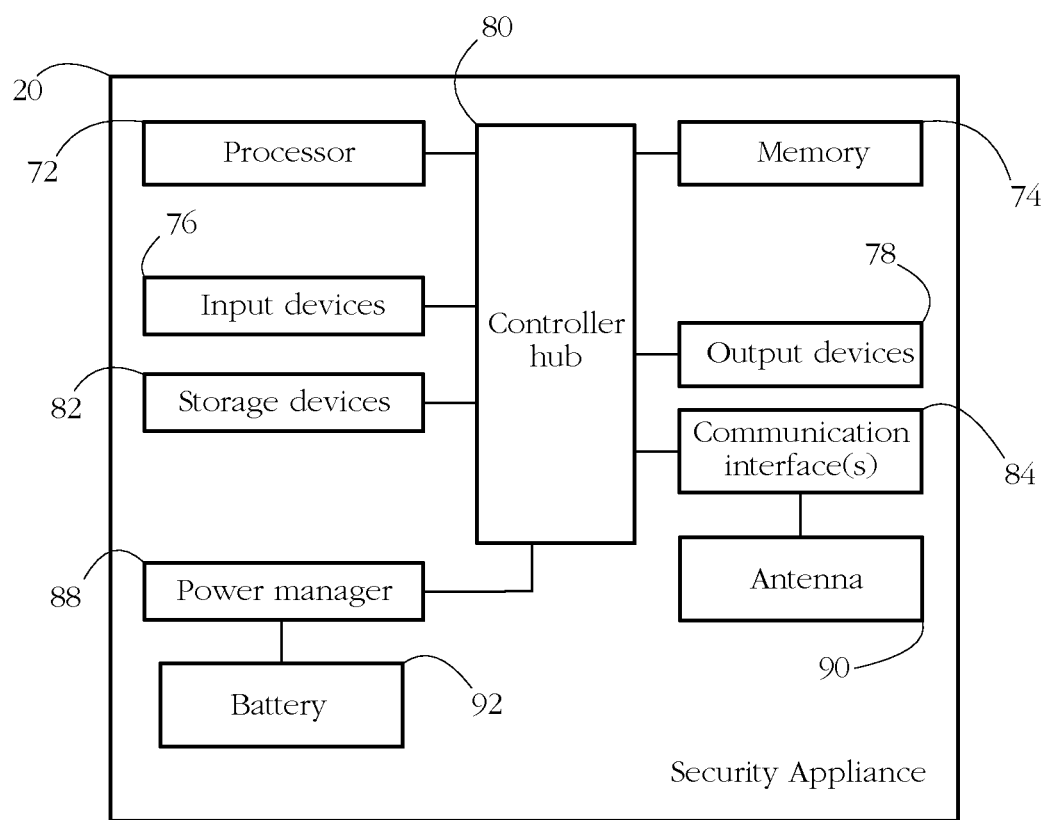
FIG. 7 shows an exemplary hardware configuration of a security appliance according to some embodiments of the present invention.

FIG. 7 shows an exemplary hardware configuration of security appliance 20 according to some embodiments of the present invention. The illustrated configuration corresponds to an embodiment wherein the functionality of appliance 20 is implemented in software. For instance, FIG. 7 may represent a personal computer executing some of the methods described herein. The architecture of other computing systems such as servers, tablet computers, smartphones, etc., may differ from the one shown in FIG. 7. In alternative embodiments, the described functionality of modules 62 and/or 64 (FIG. 5) may be implemented in dedicated hardware or may be split between hardware and software. Furthermore, in some embodiments some of the illustrated components may be grouped together onto a separate circuit board connected to a personal computer using a standard interface such as a PCI Express bus.

Processor 72 comprises a physical device (e.g. microprocessor, multi-core integrated circuit formed on a semiconductor substrate) configured to execute computational and/or logical operations with a set of signals and/or data. Such signals or data may be encoded and delivered to processor 72 in the form of processor instructions, e.g., machine code. Processor 72 may include a central processing unit (CPU) and/or an array of graphics processing units (GPU).

Memory unit 74 may comprise volatile computer-readable media (e.g. dynamic random-access memory—DRAM) storing data/signals/instruction encodings accessed or generated by processor 72 in the course of carrying out operations. Input devices 76 may include keyboards, mice, and microphones, among others, including the respective hardware interfaces and/or adapters allowing a user to introduce data and/or instructions into appliance 20. Output devices 78 may include display devices such as monitors and speakers among others, as well as hardware interfaces/adapters such as graphic cards, enabling the respective computing system to communicate data to a user. In some embodiments, input and output devices 76-78 share a common piece of hardware (e.g., a touch screen). Storage devices 82 include computer-readable media enabling the non-volatile storage, reading, and writing of software instructions and/or data. Exemplary storage devices include magnetic and optical disks and flash memory devices, as well as removable media such as CD and/or DVD disks and drives. Communication interface(s) 84 enable security appliance 20 to connect to an electronic communication network, to client devices 12*a-e*, and/or to other electronic devices. In an open systems interconnection (OSI) model of telecommunication, interface(s) 84 may implement elements of a data link and/or a network layer. Interfaces 84 may enable a plurality of carrier media and protocols, such as Ethernet, Wi-Fi, and Bluetooth®, among others. Appliance 20 may further include an antenna 90 which herein generically represents hardware implementing elements of the physical layer of communication.

Some embodiments of security appliance 20 may further include a battery 92 configured to power the illustrated hardware components, and a power manager 88 comprising hardware configured to manage power consumption and the charging of battery 92. For instance, power manager 88 may switch appliance 20 from an active to a sleep state to save energy, and may wake appliance 20 up in response to an incoming communication. Power manager 88 may further include a solar cell or any other device configured to transform an external energy source into electricity for the purpose of charging battery 92.

Controller hub 80 generically represents the plurality of system, peripheral, and/or chipset buses, and/or all other circuitry enabling the communication between processor 72 and the rest of the hardware components of security appliance 20. For instance, controller hub 80 may comprise a memory controller, an input/output (I/O) controller, and an interrupt controller. Depending on to hardware manufacturer, some such controllers may be incorporated into a single integrated circuit, and/or may be integrated with processor 72. In another example, controller hub 80 may comprise a northbridge connecting processor 72 to memory 74, and/or a southbridge connecting processor 72 to devices 76, 78, 82, 84, and 88.

The exemplary systems and methods described above enable protecting various Internet-of-things (IoT) devices from attack and malicious manipulation. Exemplary protected devices include, among others, smart locks, electronic car keys, point-of-sale and advertising beacon devices, home appliances such as thermostats and lighting fixtures, and wearable devices such as fitness sensors and smartwatches. Some embodiments are particularly suitable for protecting power-saving wireless devices, i.e., electronic devices configured to use a power-saving communication protocol such as Bluetooth® Low Energy (BLE), among others. Such devices typically lay dormant and wake up occasionally to advertise their presence and services.

Typical attacks comprise a malicious device impersonating a legitimate IoT device to trick a communication partner into believing it is exchanging data with the respective IoT device. In some embodiments, protecting a client device comprises determining a baseline notification pattern of the protected device by listening for the device's availability notifications and determining a set of features characterizing the respective availability notifications. Exemplary characteristic features include, among others, a typical signal strength (e.g., RSSI) and a typical length of time separating two consecutive availability notifications emitted by the respective device. Once a notification pattern has been established, a security appliance may scan for availability notifications. In response to detecting an availability notification, some embodiments of the security appliance may attempt to identify the sender device and determine whether the current availability notification fits a baseline notification pattern specific to the identified device. A mismatch may indicate that the current availability notification was transmitted by a malicious device masquerading as the identified device. When the current availability notification does not fit the baseline notification pattern of the identified protected device, some embodiments therefore attack the sender of the respective availability notification by responding to the availability notification and initiating a connection with the sender device. The connection may then be kept alive for an extended period of time, and/or may be used for poisoning the sender device with surrogate data, thus preventing the sender device from carrying out its intended malicious activities.

In some embodiments, determining whether a current availability notification fits a baseline notification pattern of a protected device comprises calculating a measure of similarity between the current availability notification and a typical availability notification emitted by the respective protected device. For instance, some embodiments determine a difference between a measured signal strength of the current availability notification and an average signal strength measured for other availability notifications received from the respective protected device. Another exemplary measure of similarity may be determined according to a difference between a time elapsed since the previous availability notification by the protected device and a typical inter-availability notification time interval specific to the protected device. A relatively strong similarity (small differences) may indicate that the current availability notification fits the baseline pattern. Conversely, substantial departures from the typical values may indicate that the current availability notification does not fit the baseline pattern.

Some embodiments may employ more sophisticated methods to determine whether a current availability notification fits a baseline notification pattern. In one computer experiment, a support vector machine (SVM) with radial basis function kernel was trained on RSSI and notification frequency data for multiple BLE devices, and then used to discriminate between a legitimate availability notification and one that was produced by an impersonator. Tests have shown that such a SVM was capable of identifying a malicious availability notification with at least 80% accuracy when trained on windows of just 20-30 seconds of data. Stated otherwise, after listening to a protected device for 20-30 seconds, an exemplary SVM classifier was able to learn a baseline notification pattern of the respective device with sufficient reliability to allow detection of an impersonation attack with 80% accuracy. The accuracy may be further increased by extending the period of time used for training the SVM classifier. A skilled artisan will understand that this example is not meant to limit the scope of the present invention, and that some of the methods described herein may be adapted to other classifier architectures (e.g., neural networks, etc.) and other training data beyond RSSI and advertising frequency.

The following description outlines several use case scenarios of some embodiments of the present invention.

Protecting a BLE Door Lock

A criminal may try to break into a house protected by a BLE door lock, by using a malicious BLE device to impersonate the lock and thus trick a master device (lock actuator, home security system, etc.) to connect to the malicious device instead of the lock itself. Following a successful handshake with the master device, the malicious device may prevent the master device from actuating the door lock, by intercepting the locking command. Meanwhile, the user may be under the impression that the door is locked. In some embodiments, a security appliance as disclosed herein may be installed within BLE range of the door lock and lock actuator device. The security appliance may detect the attempt of the malicious device to connect to the lock actuator and trick the malicious device into connecting to the security appliance instead, thus preventing the malicious manipulation of the lock. Such a security appliance may be integrated into a home security system, for instance.

Protecting a Smart Power Plug or Lighting System

A burglar may attempt to turn off the power and/or the light in a particular section of a target house. A security appliance as described herein may be placed within range of the smart light or power switch and trick a malicious device into connecting to the security appliance instead of the switch actuator device, thus preventing the malicious device from controlling the respective power plug or lighting system.

Protecting a Smart Pill Dispenser

An exemplary smart pill dispenser may be configured to send notifications to a patient's smartphone, for instance to tell the patient to take a specific medication. The notifications may indicate a type and count of pills, and optionally indicate a manner of taking them (e.g., with food, dissolved in water, etc.). An attacker may use an attack to trick the smartphone into connecting to a malicious device impersonating the pill dispenser, and then manipulate the medication schedule at will. A security appliance as described herein may be embodied for instance as a small, battery operated device (e.g., a keychain) that may be carried in the patient's pocket or placed on a nightstand within range of the patient's smartphone and pill dispenser. The security appliance may detect an apparent change in the advertising behavior of the pill dispenser and in response, attack the device sending the suspect availability notification (presumably a malicious device masquerading as the protected pill dispenser).

Protecting a Tire Pressure Sensor

An exemplary tire pressure sensor may send an alert to a car's computer when the air pressure in the respective tire falls below a trigger value. A criminal may use a malicious device to impersonate the tire pressure sensor and trick the car's computer into connecting to the malicious device instead of the pressure sensor. The attacker may then send a rogue signal to the car's computer indicating that the car is having a flat tire, thus forcing the driver to pull over. A security appliance as described herein may be embodied as a small portable device such as a dongle configured to plug into a universal serial bus (USB) interface or an on-board diagnostic (OBD) data port of the car. An exemplary appliance may even be integrated into a power adapter/battery charger configured to plug into the car's cigarette lighter. In yet another exemplary embodiment, security appliance 20 may be integrated into, or connected as an add-on to an existing car alarm system. The security appliance may detect a suspect availability notification seemingly originating from the pressure sensor, and in response, attack the sender of the respective message (presumably a malicious device masquerading as the pressure sensor) thus incapacitating the malicious device.

Protecting a Device Having a Location Beacon

Some anti-theft systems attach a location beacon device to a valuable asset, the beacon device configured to transmit a signal indicating a current physical location of the valuable asset, or indicating whether the respective asset is currently within range of a detector. A burglar may use a malicious device to attack the detector and masquerade as the location beacon. The malicious device may then transmit a rogue signal to the detector, indicating that everything is OK, while in fact the valuable asset has been removed from its supposed safe location. A security appliance as described herein may detect a suspect notification and connect to the malicious device, thus foiling the attack. In an exemplary embodiment, the security appliance may be integrated into or connected as an add-on to the detector device.

It will be clear to one skilled in the art that the above embodiments may be altered in many ways without departing from the scope of the invention. Accordingly, the scope of the invention should be determined by the following claims and their legal equivalents.

What is claimed is:

1. A security appliance configured to protect a client device against computer security threats, the security appliance comprising at least one hardware processor configured to:
   detect a first wireless communication comprising an availability notification emitted in preparation for establishing a peer-to-peer connection with an administration device;
   in response to detecting the first wireless communication, determine whether the first wireless communication fits a notification pattern specific to the client device, the notification pattern comprising a pattern of hopping between carrier signal frequency bands;
   in response, when the first wireless communication does not fit the notification pattern, transmit a second wireless communication configured to mimic a response by the administration device to the first wireless communication; and
   in response to transmitting the second wireless communication, perform a security action to protect the client device or the administration device.

2. The security appliance of claim 1, wherein the at least one hardware processor is configured to determine whether the first wireless communication fits the notification pattern according to a time interval separating the first wireless communication from a previously-detected wireless communication comprising another availability notification emitted by the client device.

3. The security appliance of claim 2, wherein the at least one hardware processor is configured to:
   compare a difference between a size of the time interval and a reference interval size characteristic of the client device to a pre-determined threshold; and
   in response, determine whether the first wireless communication fits the notification pattern according to a result of the comparison.

4. The security appliance of claim 1, wherein the at least one hardware processor is configured to determine whether the first wireless communication fits the notification pattern according to a notification frequency specific to the client device, the notification frequency determined according to a count of availability notifications emitted by the client device within a pre-determined time interval.

5. The security appliance of claim 1, wherein the at least one hardware processor is configured to determine whether the first wireless communication fits the notification pattern according to an indicator of a signal-to-noise ratio of a carrier signal of the first wireless communication.

6. The security appliance of claim 1, wherein
the at least one hardware processor is configured to determine whether the first wireless communication fits the pattern of hopping according to a frequency of a carrier signal of the first wireless communication and further according to another frequency of another carrier signal of another availability notification detected by the security appliance.

7. The security appliance of claim 1, wherein the at least one hardware processor is further configured, in preparation for determining whether the first wireless communication fits the notification pattern, to:
detect a plurality of availability notifications emitted by the client device; and
in response, determine the notification pattern according to the plurality of availability notifications.

8. The security appliance of claim 1, wherein mimicking the response by the administration device comprises initiating another peer-to-peer connection with a sender of the first wireless communication while impersonating the administration device.

9. The security appliance of claim 8, wherein the security action comprises maintaining the other peer-to-peer connection active for a pre-determined amount of time.

10. The security appliance of claim 8, wherein the security action comprises transmitting a set of surrogate data to the sender of the first wireless communication over the other peer-to-peer connection.

11. The security appliance of claim 8, wherein impersonating the administration device comprises configuring the second wireless communication to include an identifier of the administration device.

12. A method of protecting a client device against computer security threats, the method comprising employing at least one hardware processor of a security appliance to:
detect a first wireless communication comprising an availability notification emitted in preparation for establishing a peer-to-peer connection with an administration device;
in response to detecting the first wireless communication, determine whether the first wireless communication fits a notification pattern specific to the client device, the notification pattern comprising a pattern of hopping between carrier signal frequency bands;
in response, when the first wireless communication does not fit the notification pattern, transmit a second wireless communication configured to mimic a response by the administration device to the first wireless communication; and
in response to transmitting the second wireless communication, perform a security action to protect the client device or the administration device.

13. The method of claim 12, comprising employing the at least one hardware processor to determine whether the first wireless communication fits the notification pattern according to a time interval separating the first wireless communication from a previously-detected wireless communication comprising another availability notification emitted by the client device.

14. The method of claim 13, further comprising employing the at least one hardware processor to:

compare a difference between a size of the time interval and a reference interval size characteristic of the client device to a pre-determined threshold; and
in response, determine whether the first wireless communication fits the notification pattern according to a result of the comparison.

15. The method of claim 12, comprising employing the at least one hardware processor to determine whether the first wireless communication fits the notification pattern according to a notification frequency specific to the client device, the notification frequency determined according to a count of availability notifications emitted by the client device during a pre-determined time interval.

16. The method of claim 12, comprising employing the at least one hardware processor to determine whether the first wireless communication fits the notification pattern according to an indicator of a signal-to-noise ratio of a carrier signal of the first wireless communication.

17. The method of claim 12, comprising employing the at least one hardware processor to determine whether the first wireless communication fits the pattern of hopping according to a frequency of a carrier signal of the first wireless communication and further according to another frequency of another carrier signal of another availability notification detected by the security appliance.

18. The method of claim 12, further comprising employing the at least one hardware processor, in preparation for determining whether the first wireless communication fits the notification pattern, to:
detect a plurality of availability notifications emitted by the client device; and
in response, determine the notification pattern according to the plurality of availability notifications.

19. The method of claim 12, wherein mimicking the response by the administration device comprises initiating another peer-to-peer connection with a sender of the first wireless communication while impersonating the administration device.

20. The method of claim 19, wherein the security action comprises maintaining the other peer-to-peer connection active for a pre-determined amount of time.

21. The method of claim 19, wherein the security action comprises transmitting a set of surrogate data to the sender of the first wireless communication over the other peer-to-peer connection.

22. The method of claim 19, wherein impersonating the administration device comprises configuring the second wireless communication to include an identifier of the administration device.

23. A non-transitory computer-readable medium storing instructions which, when executed by at least one hardware processor of a security appliance, cause the security appliance to:
detect a first wireless communication comprising an availability notification emitted in preparation for establishing a peer-to-peer connection with an administration device;
in response to detecting the first wireless communication, determine whether the first wireless communication fits a notification pattern specific to a selected client device, the notification pattern comprising a pattern of hopping between carrier signal frequency bands;

in response, when the first wireless communication does not fit the notification pattern, transmit a second wireless communication configured to mimic a response by the administration device to the first wireless communication; and in response to transmitting the second wireless communication, perform a security action to protect the client device or the administration device.

* * * * *